United States Patent [19]

Lutz

[11] 4,276,548
[45] Jun. 30, 1981

[54] MICROWAVE SPEED METER

[75] Inventor: Erno B. Lutz, Sunnyvale, Calif.

[73] Assignee: Solfan Systems, Inc., Mountain View, Calif.

[21] Appl. No.: 45,237

[22] Filed: Jun. 4, 1979

[51] Int. Cl.³ .............................................. G01S 13/58
[52] U.S. Cl. ..................................... 343/7 PL; 343/8
[58] Field of Search ................................... 343/7 PL, 8

[56] References Cited

U.S. PATENT DOCUMENTS

| | | | |
|---|---|---|---|
| 3,534,285 | 10/1970 | Kobold et al. | 343/7 PL X |
| 3,729,736 | 4/1973 | Hurd | 343/7 PL X |
| 4,020,490 | 4/1977 | Millard | 343/8 |
| 4,052,722 | 10/1977 | Millard | 343/8 |
| 4,072,947 | 2/1978 | Johnson | 343/7 PL X |
| 4,143,376 | 3/1979 | Jezo | 343/7 PL X |

Primary Examiner—Malcolm F. Hubler
Attorney, Agent, or Firm—Thomas E. Schatzel

[57] ABSTRACT

A meter for measuring the relative velocity of an object, including a diplexer for illuminating the object with a beam of microwave energy and for developing from energy reflected from the object a difference signal having a frequency which is proportional to the relative velocity of the object, a phase-locked loop for synchronizing the frequency of an internal oscillator with that of the difference signal and for developing a lock signal when synchronization is achieved, a lock detector and timer and a timer for developing a reset signal from the lock signal, a predetermined period after synchronization is achieved and for developing a latch signal a predetermined period thereafter, a circuit for counting the cycles of the internal oscillator which are developed after the occurrence of the reset signal until the occurrence of the latch signal to develop a sum signal indicative of the relative velocity of the object, and a circuit for displaying the sum signal.

10 Claims, 4 Drawing Figures

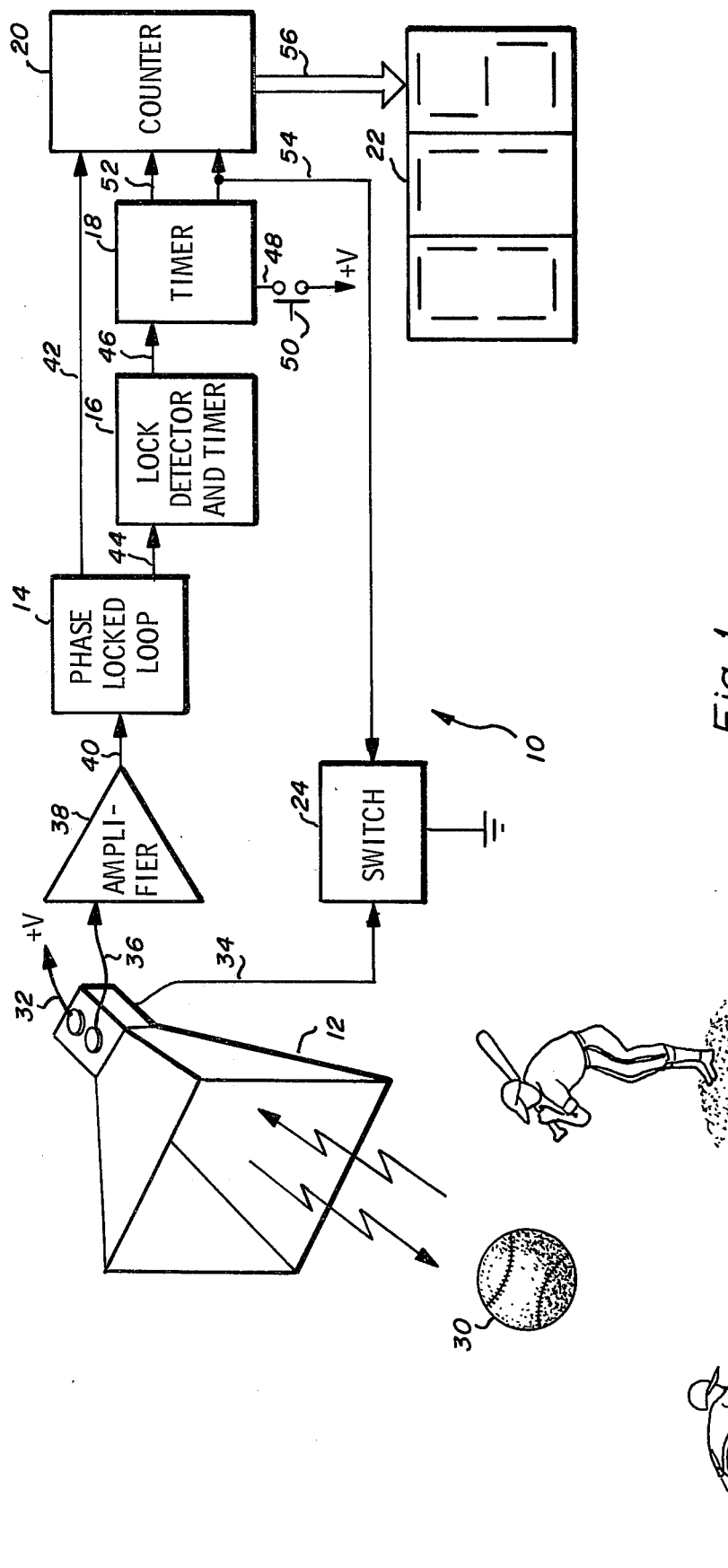
Fig_1

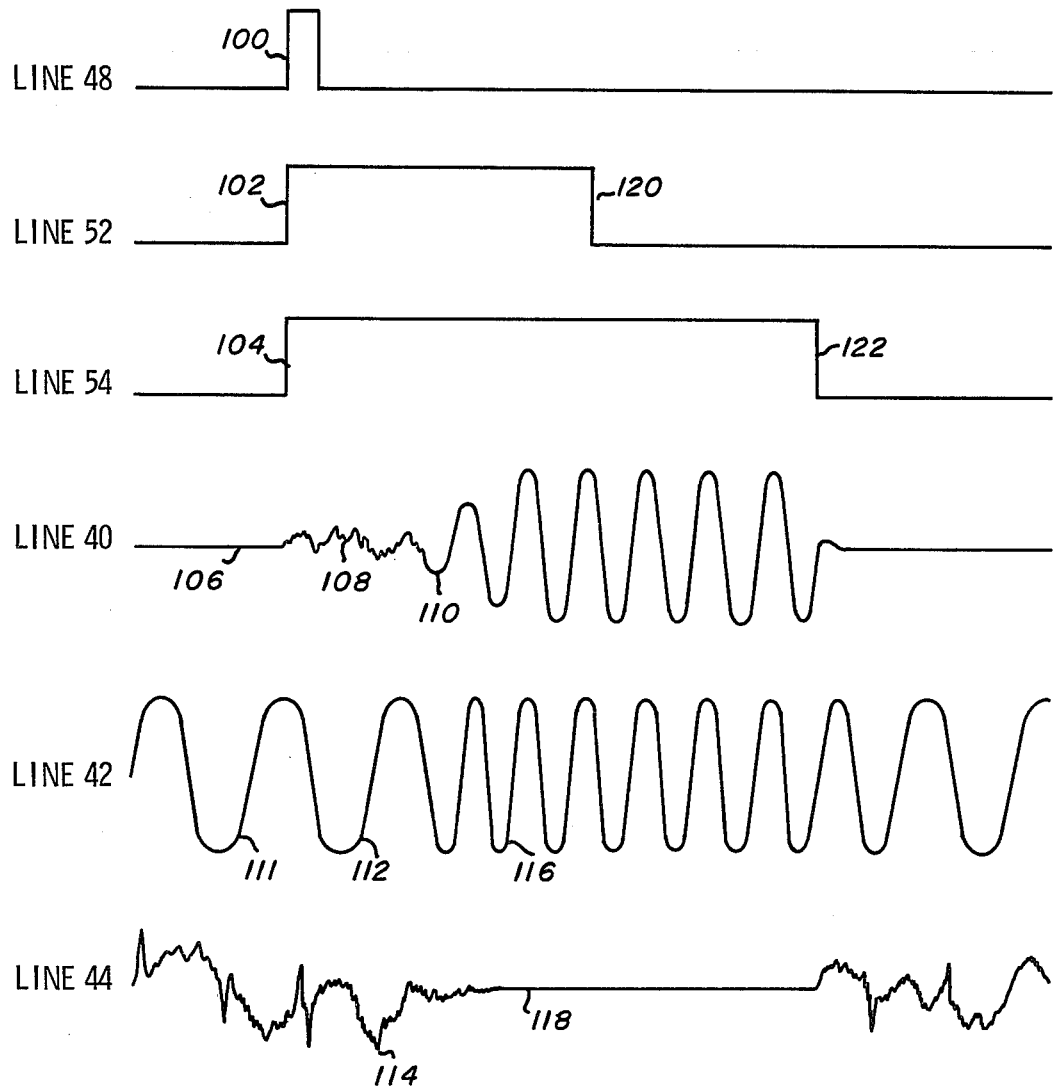
Fig_2

MICROWAVE SPEED METER

BACKGROUND OF THE INVENTION

1. Field of the Invention

The present invention relates generally to velocity measuring apparatus and more specifically to a low cost portable Doppler-type meter for use in rapidly and accurately ascertaining the relative velocity of an object.

2. Description of the Prior Art

Radar, an acronym for RAdio Detecting And Ranging, has been employed for many years as a navigational aid. Traditional radar systems make use of the known propagation rate of microwave energy to ascertain the distance from the radar to an object, the distance being proportional to the time required for microwave energy to propagate from a source to the object and for resultant reflected energy to return.

Some specialized systems alternatively or additionally, measure the relative velocity of an object. The relative velocity is the approaching or receding speed of the object. Such measurements rely on the frequency shift called Doppler shift which microwave energy undergoes when it is reflected from an object having a relative velocity with respect to the source. Such a shift is quite pronounced. For an object illuminated by 10.5 gigahertz X-band energy, the shift is of the order of 31 hertz for each mile per hour of relative velocity.

Typical portable or semi-portable prior art systems of this latter class are the Doppler-type speed meters commonly employed by law enforcement personnel to monitor the relative velocity of motor vehicles.

Early speed meters are of the continuous wave, or CW type. They employ a continuously operating microwave energy source to generate energy. A major portion of the energy is radiated so as to form a beam that may be directed along a highway. Another portion of the energy is used to bias a microwave detector.

When a motor vehicle enters the beam, a fraction of the energy illuminating the vehicle is reflected back to the source where it is mixed in the detector with the biasing energy. As a result of the mixing process, a new difference signal is generated which has a frequency equal to the difference between the frequencies of the transmitted energy and that which is received. In other words, a signal is generated having a frequency which is proportional to the velocity of the motor vehicle. This difference signal is amplified and its frequency ascertained in order to develop a visual display indicative of the relative velocity of the motor vehicle.

Throughout the years, these prior art speed meters have evolved. Although such evolution is obviously due in part to advances in technology, no doubt the primary reason for such evolution is due to the need to counteract, counter-measures taken by motorists. As motorists became more wary and employed countermeasures such as receivers tuned to radar frequencies, speed meters changed. Early meters, which because of their bulk were designed to operate from the open trunk of a vehicle, were made smaller and semi-portable and the frequency of their radiated energy sources and its polarization were changed to defeat the receivers.

To further defeat radar receivers, recent prior art speed meters have incorporated a hold mode. In the hold mode, the microwave energy source may be temporarily disabled until a motor vehicle approaches. At this time, the operator may return the meter to the regular CW mode to ascertain the speed of the vehicle.

Although effective in measuring the relative velocity of motor vehicles, these prior art meters are ill-suited for other uses such as measuring the velocity with which a tennis player serves a tennis ball or a pitcher throws a baseball. Obviously, the high cost of these prior art meters limits such use; however, they also suffer from more fundamental weaknesses. Noise in the form of energy reflected by extraneous moving objects, if significant at all, merely acts to shorten the range at which prior art meters are effective. In most cases, the range may be increased by increasing the directivity of the speed meter antenna to both increase the level of the energy striking the motor vehicle and to reduce that striking other moving objects.

Not only do baseballs and the like have a significantly smaller radar cross section and thus, reflect less microwave energy, but also the energy they reflect is much more difficult to differentiate from noise. Obviously, increases in antenna directivity are ineffective to separate energy reflected by a pitcher during wind-up or follow-through from that reflected by the ball.

Timing of the measurement is also of great significance. If the measurement starts before the ball is pitched or completed after the ball is caught, an interval which may be less than one half of one second, the measurement will be inaccurate. Further, for most accurate results, the measurement should be completed within a fraction of this interval. This is desirable both because the speed of the ball is decreasing and because, in most cases, the angle of incidence of the microwave energy with respect to the velocity vector of the ball is increasing.

SUMMARY OF THE PRESENT INVENTION

It is therefore an object of the present invention to provide a low cost portable meter for measuring the relative velocity of an object.

Another object of the present invention is to provide a speed meter which has a high degree of noise rejection.

Yet another object is to provide a meter that is fast and automatic.

Briefly, the preferred embodiment of the present invention includes a diplexer for developing a beam of object illuminating microwave energy and for receiving energy reflected from the object. The diplexer mixes the reflected energy with non-reflected energy to develop a difference signal having a coherent component, the frequency of which is proportional to the relative velocity of the object. From the difference signal, a phase-locked loop synchronizes the frequency of an internal, clocking signal generating oscillator and develops a lock signal which is relatively constant when lock is achieved and relatively unstable, noisy, otherwise.

This characteristic of the lock signal is used by a lock detector and timer which monitors the excursions of the lock signal to develop a detect signal a predetermined period after synchronization is achieved. A timer responds to the detect signal and generates a signal which resets a clock signal counting clock. A predetermined period thereafter, the timer generates a signal which causes the counter to latch the current sum and to develop display driving signals.

A principal advantage of the present invention is its simplicity.

Another advantage of the present invention is its ability to rapidly and automatically measure the relative velocity of an object in a noisy environment.

These and other objects and advantages of the present invention will no doubt become apparent to those of ordinary skill in the art after having read the following detailed description of the preferred embodiment illustrated in the several figures of the drawing.

IN THE DRAWING

FIG. 1 is a block diagram illustrating a speed meter in accordance with the present invention;

FIG. 2 is a timing diagram used to illustrate the operation of the speed meter shown in FIG. 1.

DETAILED DESCRIPTION OF THE PREFERRED EMBODIMENT

Figure 3A:
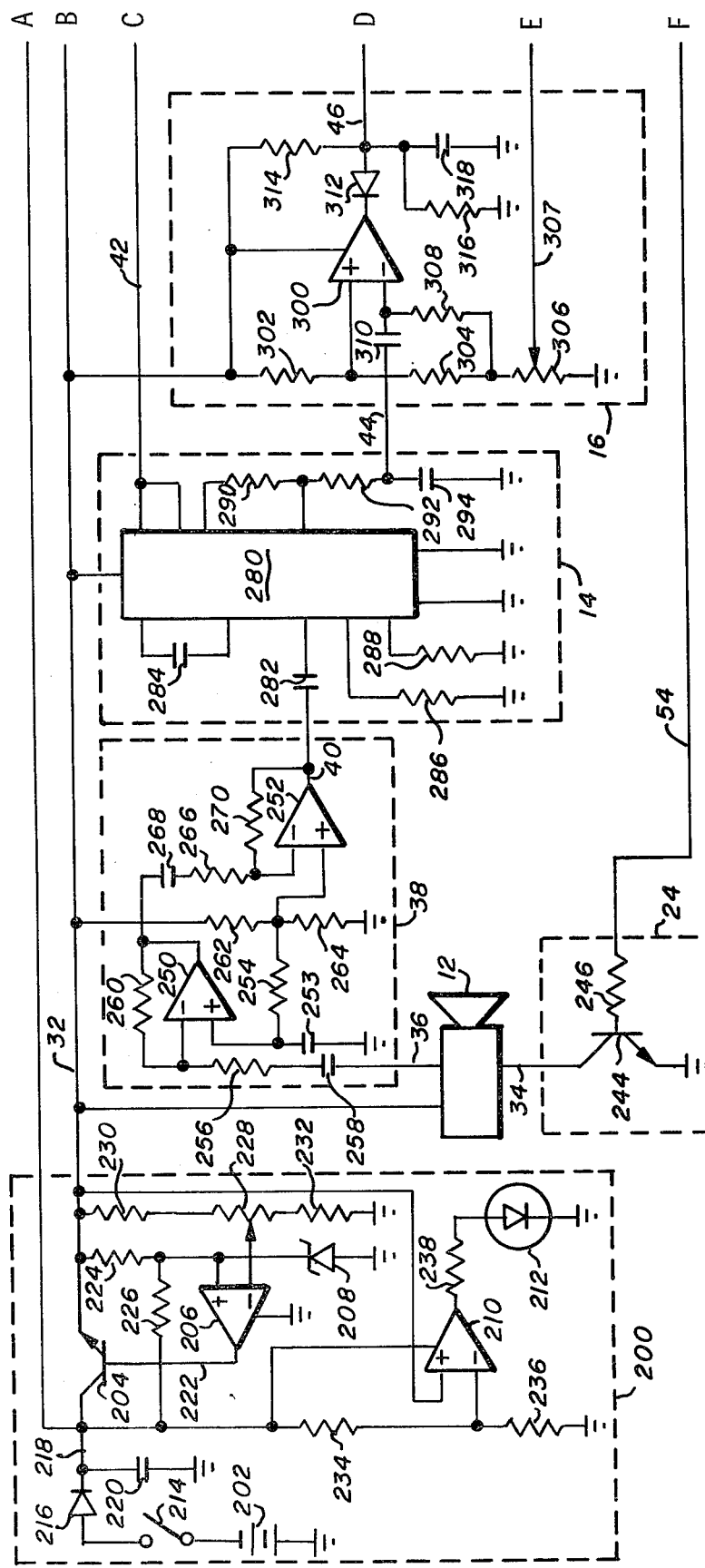
FIGS. 3A and 3B is a schematic diagram further illustrating the speed meter shown in FIG. 1.

A block diagram of a speed meter in accordance with the present invention is shown in FIG. 1. The speed meter, which is generally designated by the number 10, includes a microwave diplexer 12, a phase-locked loop 14, a lock detector and timer 16, a timer 18, a counter 20, a display 22 and an electric switch 24.

Diplexer 12 is a device for generating and radiating a beam of microwave energy which is illustrated here as illuminating a baseball 30, while simultaneously receiving energy reflected back to the diplexer from the baseball. The diplexer mixes reflected energy with a portion of the nonreflected energy it generates to produce a difference signal. The difference signal has a coherent component due to the Doppler frequency shift the energy undergoes when it is reflected from the baseball. The frequency of the coherent component is proportional to the relative velocity of the baseball.

It should be noted that baseball 30 is illustrated merely as an aid in understanding the operation of the speed meter. It is not intended as a limitation of the class of objects of which the relative velocity may be measured by this meter. Obviously, such a class is limited only by the imagination of the user.

Phase-locked loop 14 includes an internal, clocking signal generating oscillator coupled to a line 42 and circuitry for synchronizing the frequency of the internal oscillator with a coherent component of the frequency of the amplified difference signal developed on line 40.

When the frequency of the internal oscillator is synchronized with the frequency of a coherent component of the difference signal, the phase-locked loop develops on a line 44 a constant level DC signal. At times when the phase-locked loop is unable to obtain synchronization, the signal developed on line 44 is of a random, or noisy nature. This is often referred to as hunting.

Lock detector and timer 16 includes suitable circuitry for sensing the random nature of the lock signal and for developing on a line 46 a (stabilization signal) of predetermined period after the lock signal has stabilized.

Timer 18 responds to the delayed lock signal developed on line 46 and to a signal developed at an input connected by a line 48 and an arming switch 50 to a source of potential. Timer 18 develops a reset signal on a line 52 and a latch signal on a line 54.

The momentary closure of arming switch 50 causes timer 18 to reset the levels of the reset and latch signals. Following receipt of the delayed lock signal developed on line 46, the timer causes the state of the reset signal to change and, a predetermined time thereafter, it causes the state of the latch signal to change.

Counter 20 includes counting, latching and multiplexing circuitry. The counting circuitry has a clocking input connected to line 42 to receive the clocking signal developed by the internal oscillator of the phase-locked loop, a reset input connected to line 52 and a latch input connected to line 54.

The counting circuitry is reset by the transition of the reset signal and counts the cycles of the clocking signal. The count, or sum, so developed, is latched upon the transition of the latch signal and is used to drive a multiplexing circuit which develops on a bus 56 signals suitable for driving 7-segment display 22.

Switch 24, which is connected to line 34, line 54 and circuit ground, is responsive to the latch signal developed on line 54 and operative to couple line 34 to circuit ground powering diplexer 12 until such time as the latch signal changes state. In other words, diplexer 12 is powered from the time switch 50 is closed until the time counter 20 latches the sum signal.

The operation of the apparatus is believed to be as follows. Responsive to the closure of arming switch 50, timer 18 resets the state of the reset and latch signals developed on lines 52 and 54, respectively. When reset, the latch signal causes switch 24 to connect line 34 to circuit ground powering diplexer 12.

With additional reference to FIG. 2, the pulse generated on line 48 by the momentary closure of switch 50 and the resultant change of state of the reset and latch signals are illustrated at 100, 102 and 104, respectively. In the preferred embodiment the reset and latch signals are inverted at a high level when reset so as to reset or latch counter 20 on their falling edges.

When powered, diplexer 12 develops a beam of microwave energy. Should the beam illuminate an object such as baseball 30, so as to cause reflected microwave energy to be returned to the diplexer, the diplexer develops on line 36 a difference signal having a coherent component. The frequency of the coherent component is proportional to the relative velocity of the object.

With reference again to FIG. 2, the difference signal can be seen at 106 to be constant before the diplexer is powered at which time a noisy signal, illustrated at 108, is developed. As baseball 30 is illuminated, a coherent component of the signal having a frequency proportional to the velocity of the ball, illustrated at 110, will be evident. For clarity, this component of the signal is illustrated as being dominant. It should be noted, however, that in most cases this component will all but be lost in the noise.

Until a coherent component of the difference signal is detected, phase-locked loop 14 is unable to synchronize the frequency of its internal oscillator and develops a noisy, hunting signal on line 44. In FIG. 2, the output of phase-locked loop 14 is illustrated at 112 and the noisy, hunting signal at 114.

After synchronization is achieved as illustrated at 116 in FIG. 2, the level of the lock signal on line 44 is maintained at a relatively constant, or DC level as illustrated at 118 in FIG. 2.

A predetermined period of time after synchronization is achieved, as determined by lock detector and timer 16, timer 18 causes the state of the reset signal to change at 120. This clears counter 20 preparing it to count the cycles of the internal oscillator of the phase-locked loop. Another predetermined period later, timer 18 changes the state of the latch signal at 112. This latches the sum in counter 20 which is indicative of the relative velocity of the ball, and removes power from diplexer 12. At this time, counter 20 develops suitable multiplexing signals one bus 56 to drive 7-segment display 22 resulting in a display of the sum.

Now referring to FIG. 3A, the preferred embodiment of the speed meter is shown to include a power supply 200. The principal components of power supply 200 is battery 202, a regulator including a series-pass transistor 204, an operational-amplifier 206, a zener diode 208 and a low battery indicator compressing an operational-amplifier 210 and a light emitting diode LED 212.

Battery 202, which in the preferred embodiment is of the 12 volt dry cell variety, has its negative terminal connected to circuit ground and its positive terminal connected by an on-off switch 214. Switch 214 is tied to a steering diode 216 which is tied to a power supply line 218. A filter capacitor 220 is connected from line 218 to circuit ground. Steering diode 216 prevents an improperly connected batter from damaging the apparatus, and the filter capacitor removes transients generated by the meter.

The collector of series-pass transistor 204 is connected to line 218, the emitter is connected to power supply line 32 and the base is connected to a line 222. Operational-amplifier 206 has a first non-inverting input connected by a current limiting resistor 224 to line 32, by a start-up resistor 226 to line 218, by zener diode 208 to circuit ground. Amplifier 206 has a second non-inverting input connected to the wiper of a potentiometer 228. Potentiometer 228 is connected to line 32 and circuit ground by a pair of voltage divider resistors 230 and 232, respectively. The output of the operational-amplifier is connected to the base of the transistor by line 222.

As the potential developed on line 32 rises above or drops below its steady-state value the potential developed at the wiper of potentiometer 228 will be greater than or less than the reference potential, which is developed across zener diode 208. This will cause operational-amplifier 206 to reduce or increase, respectively, the current with which it drives the base of transistor 204. This brings the potential on line 32, and thus at the wiper of the potentiometer, back to its steady-state value. Resistor 226 provides sufficient current at start-up to insure that the potential developed at the non-inverting input of the operational-amplifier exceeds that developed at the wiper of potentiometer 228 to cause operational-amplifier 206 to turn on transistor 204.

For economy reasons, the regulator is made adjustable permitting the use of a low tolerance zener diode. It is of course obvious that if higher tolerance parts are employed, potentiometer 228 may be eliminated.

It is important that the diplexer, which has a sensitivity of from 10 to 15 megahertz per volt variation of the supply potential, be operated within the 10.500 to 10.550 gigahertz band authorized by the Federal Communicationa Commission for door opening and field disturbance devices.

Thus, the regulator is employed to develop on line 32 a highly accurate and highly regulated potential insuring that diplexer 12 operates at the center of its allocated frequency band and preventing frequency pushing of the diplexer.

Operational-amplifier 210 has a non-inverting input connected to line 32, an inverting input connected to the juncture of a pair of voltage divider resistors 234 and 236 that are connected between line 218 and circuit ground and an output connected by a current limiting resistor 238 and LED 212 to circuit ground. The values of resistors 234 and 236 are chosen such that when battery 202 is weak, a potential will be developed at the inverting input of the operational-amplifier which is less than that developed at its non-inverting input. This causes the operational-amplifier to power the LED to warn of the low battery condition.

Diplexer 12, which is also commonly referred to as a Gunn-plexer, is well known in the art. Commonly a DC biased Gunn diode is mounted in a mechanically tuned-in line cavity. Microwave energy is coupled from this cavity by an iris into a mixer cavity which houses a detector diode that is offset in the cavity and spaced from the iris. The mixer cavity is coupled to, in the preferred embodiment, a horn antenna having a gain of approximately 17 db. The majority of the energy generated by the Gunn diode and coupled into the mixer cavity is radiated by the antenna. A small portion of the energy, at a level approximately 10 db below that transmitted, is used to bias the detector diode. Energy reflected from objects back to the diplexer is mixed in the detector diode with the biasing energt to develop the difference signal. In the preferred embodiment, a diplexer which uses a low current Gunn device operates at approximately 7.5 volt potential is employed.

Switch 24 includes a transistor 244 having a base connected by a current limiting resistor 246 to line 54, an emitter connected to circuit ground and a collector connected to line 34.

Amplifier 38 includes as principal components, a pair of operational-amplifiers 250 and 252. Operational-amplifier 250 has a non-inverting input connected by a decoupling capacitor 253 to circuit ground and by a decoupling resistor 254 to a reference potential developed at a non-inverting input of operational-amplifier 252. Operational-amplifier 250 also has a non-inverting input connected by a series combination of a filter resistor 256 and a filter capacitor 258 to line 36 and by a feed-back resistor 260 to its output. The non-inverting input of operational-amplifier 252 is also connected to the juncture of a pair of voltage divider resistors 262 and 264 that are connected between power supply line 32 and circuit ground, respectively. An inverting input of operational-amplifier 252 is connected by the series combination of a filter resistor 266 and a filter capacitor 268 to the output of operational-amplifier 250. The inverting input of operational-amplifier 252 is also connected by a feedback resistor 270 to its output which is connected to line 40.

In addition to providing DC blocking, capacitor 258 with resistor 256 function as a high-pass filter having a cut-off frequency of approximately 700 hertz. Resistor 256, with feed-back resistor 260, sets the voltage gain of the operational-amplifier, which in the preferred embodiment, is slightly less than 330. Operational-amplifier 252 functions in a manner similar to that of operational-amplifier 250 with capacitor 268 and resistor 266 providing low frequency roll-off and resistors 266 and 270 setting the voltage pin, again at approximately 330. Resistors 262 and 264 provide a reference potential at the inverting input of operational-amplifier 252. This reference potential is decoupled by resistor 254 and capacitor 253 to also provide a reference potential for the non-inverting input of operational-amplifier 250.

Since the gain of both operational-amplifiers rolls off naturally at approximately 4 kilohertz, amplifier 38 has a band width of from 700 hertz to 4 kilohertz with 12 db per octave skirts, thereby limiting the meter range to from 20 to 120 miles-per-hour. The total voltage gain of amplifier 38 is approximately 100,000.

In the preferred embodiment, operational-amplifiers 206, 210, 250 and 252 are portions of a quad operational-amplifier such as that commonly referred to by the designation 358 manufactured by the National Semiconductor Corporation under the designation LM 358.

Preferably, phase-locked loop 14 includes a phase-locked loop circuit 280 designated by the number CD4046 by the National Semiconductor Corporation. Phase-locked loop circuit 280 includes an internal comparator circuit having a first input connected by a DC blocking capacitor 282 to line 40, an internal voltage controlled oscillator circuit having a pair of inputs connected to an external center frequency determining capacitor 284, and a pair of inputs connected by a pair of frequency range determining resistors 286 and 288 to circuit ground. The second input to the comparator circuit and the output of the voltage controlled oscillator circuit are connected to line 42. The voltage control input of the voltage controlled oscillator is connected by a resistor 290 to the output of the comparator circuit and by a resistor 292 to line 44 which is connected to circuit ground by a capacitor 294.

Capacitor 284, with resistor 286 determine the center frequency of the voltage controlled oscillator circuit. Resistor 286 with resistor 288 determine the frequency excursion range of the oscillator. In the preferred embodiment, the center frequency of the oscillator was chosen to correspond generally with the center frequency of the pass band of amplifier 38, and the frequency excursion range of the oscillator circuit was chosen to be approximately 10 to 1. Resistors 290 and 292 and capacitor 294 function as a lead-lag feed-back network providing, in the preferred embodiment, critical damping at the voltage controlled oscillator current frequency.

Lock detector and timer 16 includes an operational-amplifier 300 having a non-inverting input connected by a voltage divider resistor 302 to power supply line 32 and by another voltage divider resistor 304 to one end of a voltage divider potentiometer 306. The other end of potentiometer 306 is connected to circuit ground and the wiper is connected to a line 307. Operational-amplifier 300 also has an inverting input which is connected by a decoupling resistor 308 to the juncture of resistor 304 and the potentiometer and by a DC blocking capacitor 310 to line 44. The output of operational-amplifier 300 is connected by a steering diode 312 to line 46. Connected between line 46 and power supply line 32 is a time constant resistor 314. Connected between line 46 and circuit ground is both a time constant resistor 316 and a time constant capacitor 318.

The voltage divider network comprised of resistor 302, resistor 304 and potentiometer 306 develops a first reference potential at the non-inverting input of operational-amplifier 300 and another, somewhat lower, reference potential coupled by resistor 308 to the inverting input of the operational-amplifier. It should be noted that when so biased, and when a noisy, hunting, signal is developed on line 44, the signal will cause the potential developed at the inverting input of the operational-amplifier to periodically exceed the reference potential generated at its non-inverting input. When this occurs, the operational-amplifier, through diode 312, will clamp at near circuit ground potential that potential which has been developed across capacitor 318. Thus, as long as the phase-locked loop is unable to detect within the difference signal a coherent component with which it can synchronize the frequency of its internal oscillator, operational-amplifier 300 and diode 312 will prevent resistor 314 from developing a significant potential across the capacitor.

Figure 3B:
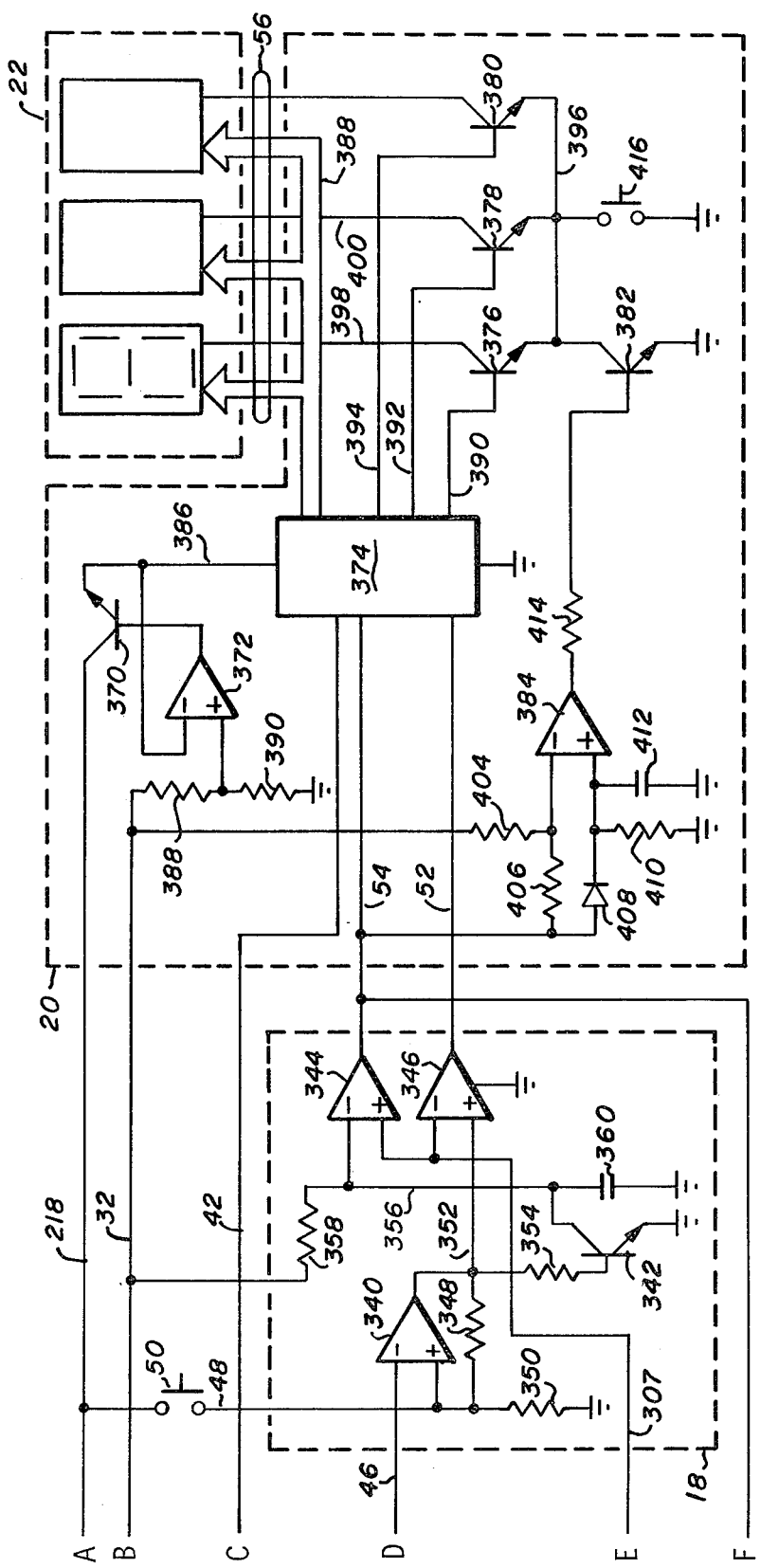

When phase-locked loop 14 is able to synchronize the frequency of its internal oscillator, the signal it generates on line 44 will be relatively constant. Lacking the random excursions, the signal will no longer cause the potential developed at the inverting input of operational-amplifier 300 to exceed the potential developed at its non-inverting input. Operational-amplifier 300 will then develop a relatively high potential at its output, which potential exceeds the potential that may be developed on line 46. This will back bias diode 312 permitting resistor 314 to charge capacitor 318 to a potential determined by resistors 314 and 316. A predetermined time after synchronization is achieved, the potential developed across capacitor 318 will rise to a level which will trigger timer 18 (See FIG. 3B).

Timer 18 includes as principal components an operational-amplifier 340, a transistor 342 and a pair of operational-amplifiers 344 and 346. Operational-amplifier 340 has an inverting input connected to line 46 and a non-inverting input connected to line 48 and to the juncture of a voltage divider comprised of a pair of resistors 348 and 350 that are connected between a line 352 and circuit ground. The operational-amplifier has an output connected to line 352.

The base of transistor 342 is connected by a current limiting resistor 354 to line 352, the emitter is connected to circuit ground and the collector is connected to a line 356. Line 356 is connected by a timing resistor 358 to power supply line 32 and by a timing capacitor 360 to circuit ground. Operational-amplifier 344 has an inverting input connected to line 356, a non-inverting input connected to line 307 and an output connected to line 54. Operational-amplifier 346 has an inverting input connected to line 307, a non-inverting input connected to line 352 and an output connected to line 52.

In the preferred embodiment operational-amplifiers 300, 340, 344 and 346 are portions of a quad operational-amplifier such as that commonly designated 358.

Operational-amplifier 340 operates both as a comparator and as a latch. The momentary closure of switch 50 develops at the non-inverting input of the operational-amplifier a potential in excess of that which may be developed on line 46. This causes operational-amplifier 340 to develop a high output potential on line 352. Upon release of switch 50, the high potential on line 352 develops, by means of resistors 348 and 350, a high potential on line 48 maintaining the state of the operational-amplifier. A predetermined time after the phase-locked loop synchronizes the frequency of its internal oscillator with that of a coherent component of the difference signal and thus develops a relatively constant potential on line 44, resistor 314 will have charged capacitor 318 to a potential in excess of that developed on line 48. When this occurs, operational-amplifier 340 will change its state to thereafter develop a relatively low potential on line 352.

When the potential developed on line 352 is high, a current will flow through resistor 354 saturating transistor 342. In this state, the transistor will provide a path to discharge capacitor 360. During this time, the potential at the non-inverting input of operational-amplifier 346 will be greater than that developed at the wiper of potentiometer 306 causing the operational-amplifier to develop a high potential level on reset line 52. Since the high level on line 352 will cause transistor 342 to discharge capacitor 360, operational-amplifier 344 will likewise develop a high potential on latch line 54.

Next, when the potential developed on line 352 goes to a low level, the potential developed at the inverting input of operational-amplifier 346 will exceed that developed at its non-inverting input causing the state of operational-amplifier 346 and thus the signal developed on reset line 52 to change. The low potential on line 352 will also turn off transistor 342 permitting resistor 358 to charge capacitor 360. In a predetermined period of time capacitor 360 will charge to a potential sufficient to cause the change of state of operational-amplifier 344 and thus that of the latch signal developed on line 54.

It should be noted that for the intended application, the repeatability of the time period determined by resistor 358 and capacitor 360 is sufficient. It is of course understood that should it be desirable to measure this period more accurately, a crystal controlled oscillator or other stable oscillator driven count-down timing chain could be employed.

Counter 20 is shown to include as principal components a regulator circuit including a series-pass transistor 370 and an operational-amplifier 372, a counter circuit 374, four transistors 376, 378, 380 and 382 and an operational-amplifier 384.

Transistor 370 has a collector connected to power supply line 218, an emitter connected by a line 386 to counter circuit 374 and a base connected to the output of operational-amplifier 372. Operational-amplifier 372 also has an inverting input connected to line 386 and a non-inverting input connected to the juncture of a voltage divider comprised of a pair of resistors 388 and 390 that are series connected between power supply line 32 and circuit ground.

Preferably, counter 374 is a device such as that designated MM74C925 by the National Semiconductor Corporation. The circuit has a clocking input connected to line 42, a latching input connected to line 54 and a reset input connected to line 52. The circuit also has multiplexing outputs connected to a bus 388 and three lines 390, 392 and 394.

Transistors 376, 378 and 380 have emitters connected to a line 396, bases connected to lines 390, 392 and 394 and collectors connected to display 22 by a line 398, a line 400 and a line 402, respectively.

Operational-amplifier 384 has an inverting input connected by a voltage divider resistor 404 to power supply line 32 and by another voltage divider resistor 406 to line 54. The operational-amplifier also has a non-inverting input connected by a steering diode 408 to line 54 and to circuit ground both by a time constant resistor 410 and by a time constant capacitor 412 and an output connected by a current limiting resistor 414 to the base of transistor 382. Transistor 382 also has an emitter connected to circuit ground and a collector connected to line 396 also connected to circuit ground by a recall switch 416.

Preferably, operational-amplifiers 372 and 374 are part of a quad operational-amplifier of the type commonly designated 358.

The regulator, which includes transistor 370 and operational-amplifier 372 develops a stable potential of preferably 4.5 volts on line 386 to power counter circuit 374. The regulator circuit is incorporated in order to limit the dissipation of the counter circuit. It is anticipated that other counter circuits may be employed instead of circuit 374 eliminating the need of this additional regulator.

Counter circuit 374, after being reset by the signal developed on line 52, counts the cycles of the clocking signal developed on line 42 until the occurrence of the latch signal developed on line 54. Thereafter, the counter circuit develops anode drive multiplexing signals on bus 388 and cathode selecting multiplexing signals on lines 390, 392 and 394.

During the time when the latch signal developed on line 54 is at a high level, current flowing through resistor 406 and diode 408 will bias both inputs of operational-amplifier 384 to a high potential level. Because of the additional bias provided by resistor 404 and the voltage drop developed across diode 408, the potential at the inverting input will exceed that developed at the non-inverting input of the operational-amplifier causing the output of the operational-amplifier to be at a low level, turning off transistor 382 and preventing cathode current from flowing from the display.

When the latch signal developed on line 54 goes to a low level, a new lower potential as determined by resistors 404 and 406, will be developed at the inverting input of operational-amplifier 384. Because of the charge on capacitor 412 the potential developed on the non-inverting input of the operational-amplifier will momentarily exceed that developed on its inverting input. This will cause the output of the operational-amplifier to go to a high level, saturating transistor 382 and permitting cathode current to flow from the displays through the transistor to circuit ground. Approximately 5 seconds later, capacitor 412 will so discharge as to cause the state of operational-amplifier 384 to charge, turning off display 22. Thereafter, the display may be manually turned on by depressing recall switch 416.

Display includes, in the preferred embodiment, three 7-segment display devices of the type which are well known in the art.

It is contemplated that after having read the preceding disclosure, certain alterations and modifications of the present invention will no doubt become apparent to those skilled in the art. It is therefore intended that the following claims be interpreted to include all such alterations and modifications as fall within the true spirit and scope of the invention.

What is claimed is:

1. A meter for measuring the relative velocity of balls and the like employed in sporting activities comprising, in combination:
   diplexer means for generating a beam of object illuminating microwave energy, for receiving doppler shifted microwave energy reflected from the object and for detecting said reflected doppler shifted microwave energy to develop a difference signal having a coherent component the frequency of which is proportional to the relative velocity of the object;
   phase-locked loop means including clock signal generating means, said phase-locked loop means for synchronizing the frequency of said clock signal generating means to that of the coherent component of said difference signal and for developing a lock signal indicative of when such synchronization has been achieved;

lock detector and timer and means responsive to said lock signal for developing a stabilization signal after the frequency of said clock signal generating means has been synchronized for a predetermined stabilization period;

counter timing means responsive to said stabilization signal for developing a reset signal upon receipt of said stabilization signal and for developing a latch signal a predetermined count period thereafter;

counter means reset by said reset signal for counting the cycles of said clock signal occurring between the occurrence of said reset and latch signals to develop a sum signal; and means responsive to said sum signal for displaying the relative velocity of the object.

2. A meter as recited in claim 1 wherein, said lock signal includes an AC component of at least a predetermined average amplitude until the frequency of said clock signal generating means has been synchronized;

said lock detector and timer means includes a first time constant capacitor and means for charging said first time constant capacitor whereby said stabilization signal is developed and comparator means for discharging said first time constant capacitor when the instantaneous level of said lock signal exceeds by a predetermined level the average level thereof; and wherein said counter timing means includes means for developing said reset signal when the potential developed across said first time constant capacitor exceeds a predetermined level, and means for developing said latch signal said predetermined count period after the occurrence of said reset signal.

3. A meter as recited in claim 2 wherein, said comparator means includes an operational amplifier having a first input terminal biased at a first potential, a second input terminal biased at a second potential which second potential differs from said first potential by a predetermined amount, and an output terminal; a coupling capacitor for coupling said AC component of said lock signal to a predetermined one of said input terminals; and a steering diode connected between said output terminal and said first time constant capacitor.

4. A meter as recited in claim 2 wherein, said reset signal developing means includes a first operational-amplifier having an inverting input terminal coupled to said first time constant capacitor, a non-inverting input terminal, and an output terminal, a first resistor connected between said output terminal and said non-inverting input terminals of said first operational-amplifier, a second resistor connected between said non-inverting input terminal and a predetermined reference potential, and means coupling said output terminal of said first operational-amplifier to said counting means.

5. A meter as recited in claim 4 wherein, said latch signal developing means includes a first transistor having a base terminal coupled to said output terminal of said first operational-amplifier, an emitter terminal, and a collector terminal; a second operational-amplifier having a first input terminal, a second input terminal, and an output terminal at which said latch signal is developed, a second time constant capacitor coupled between said emitter terminal and said collector terminal, said second time constant capacitor being further connected to a predetermined one of said first and said second terminals of said second operational-amplifier, said other one of said first and said second terminals of said second operational-amplifier being biased at a predetermined reference potential, and means for charging said second time constant capacitor.

6. A meter as recited in claim 1 further comprising switch means responsive to said latch signal and operative to couple operating power to said diplexer means until the occurrence of said latch signal.

7. A meter as recited in claim 6 wherein, said lock signal includes an AC component of at least a predetermined average amplitude until the frequency of said clock signal generating means has been synchronized;

said lock detector and timer means includes a first time constant capacitor and means for charging said first time constant capacitor whereby said stabilization signal is developed and comparator means for discharging said first time constant capacitor when the instantaneous level of said lock signal exceeds by a predetermined level the average level thereof; and wherein said counter timing means includes means for developing said reset signal when the potential developed across said first time constant capacitor exceeds a predetermined level, and means for developing said latch signal said predetermined count period after the occurrence of said reset signal.

8. A meter as recited in claim 7 wherein, said comparator means includes an operational-amplifier having a first input terminal biased at a first potential, a second input terminal biased at a second potential which second potential differs from said first potential by a predetermined amount, and an output terminal;

a coupling capacitor for coupling said AC component of said lock signal to a predetermined one of said input terminals; and a steering diode connected between said output terminal and said first time constant capacitor.

9. A meter as recited in claim 7 wherein, said reset signal developing means includes a first operational-amplifier having an inverting input terminal coupled to said first time constant capacitor, a non-inverting input terminal, and an output terminal, a first resistor connected between said output terminal and said non-inverting input terminals of said first operational-amplifier, a second resistor connected between said non-inverting input terminal and a predetermined reference potential, and means coupling said output terminal of said first operational-amplifier to said counting means.

10. A meter as recited in claim 9 wherein, said latch signal developing means includes a first transistor having a base terminal coupled to said output terminal of said first operational-amplifier, an emitter terminal, and a collector terminal; a second operational-amplifier having a first input terminal, a second input terminal, and an output terminal at which said latch signal is developed, a second time constant capacitor coupled between said emitter terminal and said collector terminal, said second time constant capacitor being further connected to a predetermined one of said first and said second terminals of said second operational-amplifier, said other one of said first and said second terminals of said second operational-amplifier being biased at a predetermined reference potential, and means for charging said second time constant capacitor.

* * * * *